United States Patent [19]

Dale et al.

[11] 4,330,682
[45] May 18, 1982

[54] HYBRID PARTICLE TRAPS AND CONDITIONING PROCEDURE FOR GAS INSULATED TRANSMISSION LINES

[75] Inventors: Steinar J. Dale, Monroeville; Alan H. Cookson, Churchill, both of Pa.

[73] Assignee: The United States of America as represented by the Department of Energy, Washington, D.C.

[21] Appl. No.: 206,755

[22] Filed: Nov. 14, 1980

[51] Int. Cl.³ .......................... H01B 9/06; H01B 9/04; H02G 5/06; B08B 7/02
[52] U.S. Cl. ..................................... 174/14 R; 134/1; 134/42; 174/28; 361/233
[58] Field of Search .................... 174/14 R, 16 B, 27, 174/28, 29, 99 R, 99 B; 307/147; 361/233; 134/1, 4, 42; 15/1.5 R; 55/2, 105, 110, 111, 112, 134

[56] References Cited

U.S. PATENT DOCUMENTS

| | | | |
|---|---|---|---|
| 3,515,939 | 6/1970 | Trump | 174/14 R X |
| 3,765,941 | 10/1973 | Gordon | 134/42 |
| 3,792,188 | 2/1974 | Cronin | 174/14 R X |
| 3,895,176 | 7/1975 | Cookson et al. | 174/28 |
| 3,911,937 | 10/1975 | Sletten et al. | 134/4 X |
| 4,064,353 | 12/1977 | Bolin | 174/14 R |
| 4,084,064 | 4/1978 | Bowman | 174/14 R |

Primary Examiner—Laramie E. Askin
Attorney, Agent, or Firm—M. S. Yatsko

[57] ABSTRACT

A gas insulated transmission line includes an outer sheath, an inner conductor within the outer sheath, insulating supports supporting the inner conductor within the outer sheath, and an insulating gas electrically insulating the inner conductor from the outer sheath. An apertured particle trapping ring is disposed within the outer sheath, and the trapping ring has a pair of dielectric members secured at each longitudinal end thereof, with the dielectric members extending outwardly from the trapping ring along an arc. A support sheet having an adhesive coating thereon is secured to the trapping ring and disposed on the outer sheath within the low field region formed between the trapping ring and the outer sheath. A conditioning method used to condition the transmission line prior to activation in service comprises applying an AC voltage to the inner conductor in a plurality of voltage-time steps, with the voltage-time steps increasing in voltage magnitude while decreasing in time duration.

13 Claims, 3 Drawing Figures

HYBRID PARTICLE TRAPS AND CONDITIONING PROCEDURE FOR GAS INSULATED TRANSMISSION LINES

GOVERNMENT RIGHTS STATEMENT

The Government has rights in this invention pursuant to Contract No. ET-78-C-01-3029 awarded by the United States Department of Energy.

CROSS-REFERENCE TO RELATED APPLICATIONS

Reference is made to the below-listed pending applications which have as an inventor or co-inventor at least one of the co-inventors of the instant application.

1. U.S. pat. application Ser. No. 206,753, filed Nov. 14, 1980, entitled "Particle Trap With Dielectric Barrier For Used In Gas Insulated Transmission Lines" by S. J. Dale.

2. U.S. pat. application Ser. No. 796,578, filed May 13, 1977 entitled "Gas-Insulated Electrical Apparatus Utilizing Adhesive Particle Trap" by A. H. Cookson, et al, now abandoned.

BACKGROUND OF THE INVENTION

This invention relates generally to high-voltage electrical apparatus, and more particularly to an improved particle trapping system for use in gas insulated transmission lines, and to an improved method for conditioning gas-insulated transmission lines.

High-voltage gas-insulated transmission lines typically comprise an outer sheath at low or ground potential, an inner conductor at high potential with respect to the grounded outer sheath which is disposed within the outer sheath, and support insulators for insulatively supporting the inner conductor within the outer sheath. An insulating gas is generally utilized to electrically insulate the inner conductor from the outer sheath, with the result that the high dielectric strength of the insulating gas enables closer, more compact spacings between the inner conductor and the outer sheath. Sulfur hexafluoride has been utilized as the insulating gas for many reasons associated with its useful combination of vapor pressure, chemical stability, cost, electric strength, thermal conductivity, and non-toxicity, among other properties.

One problem which has arisen in the design of these high-voltage gas-insulated transmission lines is the effect of the mobile conducting or semi-conducting particle. These particles may be remaining in the line after assembly, or may be produced during operation, and can traverse between the outer sheath and the inner conductor to thereby cause sparking, corona, or can lead to flashovers and breakdown of the insulating gas, or the insulating support. These contamination particles can lower the breakdown strength of the sulfur hexafluoride gas. In order to overcome these particles effects, it may be necessary to increase the size of the gas-insulated transmission line, or include within the transmission line means for eliminating or deactivating the conducting particles.

One means utilized in the prior art to deactivate these particles has been the use of low electric field regions as taught by Trump in U.S. Pat. No. 3,515,939. The low field regions are created by including within the transmission line conducting electrodes which are electrically connected to the outer sheath and which have portions thereof spaced therefrom, so that a low field region is formed between the electrode and the outer sheath. These electrodes are generally known as particle traps.

The principle of a particle trap is to create a region of very low or zero field in the compressed gas insulated transmission system into which particles can be moved by an electric field. The trap usually consists of a longitudinal metallic shield or cylinder mounted around the insulator inside and spaced-apart from the bottom of the outer sheath. Slots are provided in the bottom of the trap surface for particles to fall through and into the low field region where they are deactivated.

It has been found that, with such an elevated trap, most of the particle contaminates are captured by migrating through the opening between the trap and the enclosure when the applied 60 hertz voltage to the inner conductor is just above the voltage required for the particles to be lifted off the outer sheath surface. The activity and bounce height of the particles are then limited and the particles move and remain close to the outer sheath surface. This condition is most desirable for effective particle migration into the traps and because it reduces the chance of particles moving onto the insulator or moving to the high field conductor where they could cause breakdown. Once the particles are in the trap area, it is important that they be retained and not be permitted to escape again at a higher voltage, as this escape may result in breakdown and thus damage to the system requiring the transmission line section to be opened and repaired.

SUMMARY OF THE INVENTION

In accordance with this invention an improved gas-insulated transmission line is provided supplying the particle retention characteristics desired and which includes an elongated cylindrical outer sheath at low potential with an inner conductor at high potential disposed within the outer sheath. An insulating gas electrically insulates the inner conductor from the outer sheath and means are provided for insulatably supporting the inner conductor within the outer sheath. An apertured particle trapping ring is disposed within, and electrically connected to, said outer sheath so as to form a low field region between the trapping ring and the outer sheath. A pair of dielectric members are secured to the longitudinal ends of the trapping ring, with both dielectric members extending longitudinally outwardly from the trapping ring and radially outwardly toward the outer sheath. A support sheet is secured to the trapping ring and disposed on the outer sheath within the low field region, with the support sheet having an adhesive coating thereon on the surface facing the trapping ring.

Further, the transmission line is preferably conditioned by the steps of tilting the transmission line at an angle to the horizontal and then applying an alternating current (AC) voltage to the inner conductor in a plurality of voltage-time steps, with the voltage-time steps increasing in voltage magnitude while decreasing in time duration.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figure 1:
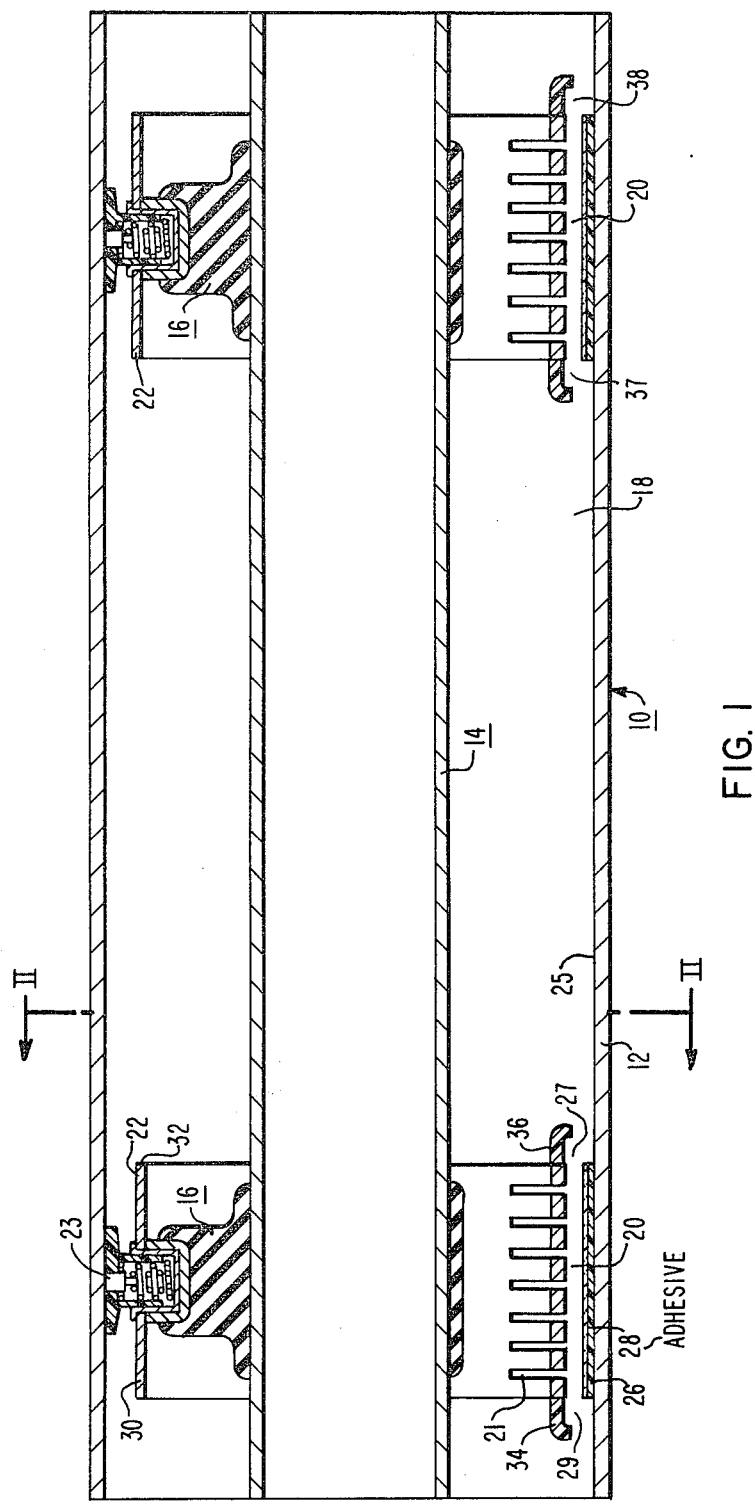
FIG. 1 is a sectional view of a gas-insulated transmission line utilizing the teachings of this invention.
Figure 2:
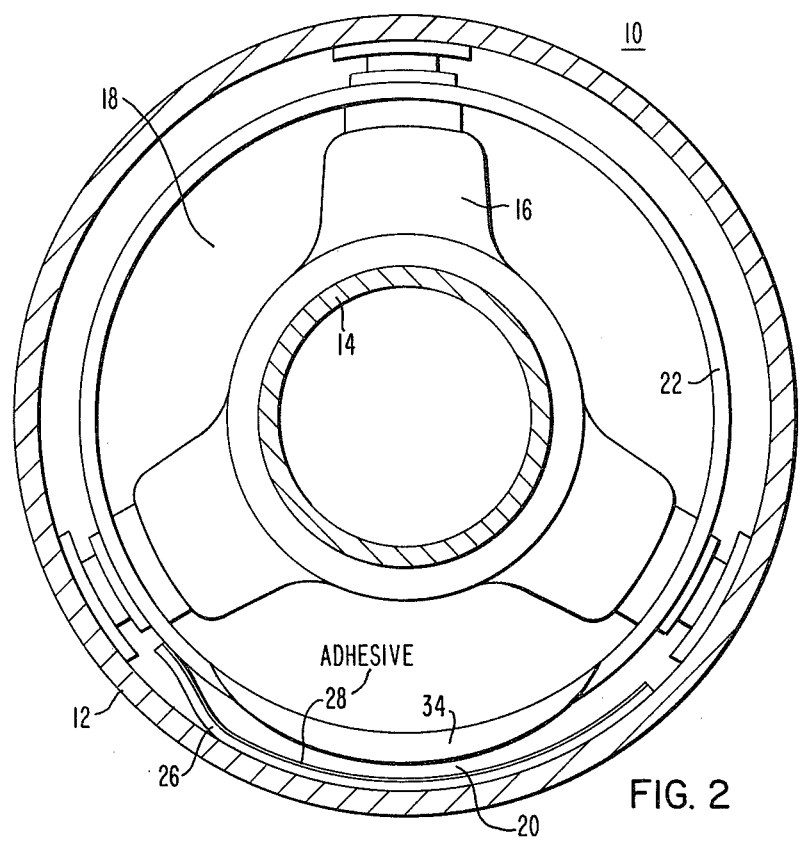
FIG. 2 is a sectional view of the transmission line taken along line II—II of FIG. 1.

Referring now more particularly to FIGS. 1 and 2, therein is illustrated a gas-insulated transmission line 10 according to the teachings of this invention. The transmission line 10 is comprised of an elongated, cylindrical outer sheath 12 at low or ground electrical potential, with an inner conductor 14 at high electric potential with respect to the outer sheath 12 disposed within the outer sheath 12. The inner conductor 14 would be at an electrical potential of, for example, 121–1200 kV and both the outer sheath 12 and the inner conductor 14 would be constructed of a good electrically conducting material such as aluminum. An insulating gas 18, typical of which is sulfur hexafluoride at a pressure of 50 pounds per square inch gauge, is disposed within the outer sheath 12 and electrically insulates the inner conductor 14 from the outer sheath 12. A plurality of insulating supports 16 are utilized for insulatably supporting the inner conductor 14 within the outer sheath 12. A particle trapping ring 22 is disposed within the outer sheath 12 adjacent to, and is secured to, the insulating support 16, and is electrically connected to the outer sheath 12 by means such as the contact button 23. A more detailed description of the electrical connection between the particle trapping ring 22 and the outer sheath 12 can be found in U.S. Pat. No. 4,084,064.

The particle trapping ring 22 has a plurality of slots 21 in the surface thereof to allow any contamination particles which may be present within the insulating gas 18 to fall therethrough. The particle trapping ring 22, as shown, is elevated above the bottom interior surface 25 of the outer sheath 12 to allow particles to enter the low or zero region 20 which exists under the trapping ring 22 between the trapping ring 22 and the outer sheath 12. Under the trapping ring 22, and fixed to the trapping ring 22 as shown in FIG. 2, is a thin, conformal support sheet 26 of either metal or, as shown, an insulating plastic which has an adhesive coating 28 thereon on the surface facing the trapping ring 22. This adhesive coated support sheet 26 is disposed on and rests on the outer sheath 12 and slides with the particle trapping ring 22 whenever a relative motion between the inner conductor 14 and the outer sheath 12 occurs. The function of the adhesive 28 is to capture and permanently retain any contamination particles which enter the region 20 under the trap 22 through the slots 21 or through the end openings 27, 29 between the trapping ring 22 and the outer sheath 12. The particles captured on the adhesive coating 28 therefore cannot reenter the transmission line 10, for example, during shipping and installation in the field and during service which might initiate failure at later times. The support sheet 26 and the adhesive surface 28 thereon should not extend past the longitudinal ends 30, 32 of the trapping rings 22. By being so positioned, particles which are trapped on the adhesive 28 are only trapped in the low field region 20 under the traps 22.

In order to insure that particles which come to rest adjacent the edge 37, 38 of the trapping ring 22 at a given voltage level and which are not attached on the adhesive 28 do not reenter the transmission line 10 when the voltage is increased, the particle trapping ring 22 is extended by a pair of dielectric members 34, 36. The dielectric member 34 is secured to the longitudinal end 30 of the trapping ring 22, and the dielectric member 36 is secured to the longitudinal end 32 of the particle trapping ring 22. Both dielectric members 34, 36 extend longitudinally outwardly from the trapping ring 22 and radially outwardly towards the outer sheath 12 along a curve or arc. The dielectric members 34, 36 are curved such that any particles which are lifted from the edge area 37, 38 under the dielectric members 34, 36 but not on the adhesive surface 28 are deflected back and onto the adhesive surface 28 under the trapping ring 22.

The use of the adhesive material 28 on the support sheet 26 in conjunction with the dielectric members 34, 36 ensures that any contamination particles present within the insulating gas 18 which are trapped by the particle trapping system are only trapped on the adhesive 28 in the very low field region 20 between the trapping ring 22 and the outer sheath 12, and are not trapped, for example, in the only slightly lowered field regions 37, 38 where they may be reactivated upon an increase in the voltage occurring on the inner conductor 14.

Figure 3:
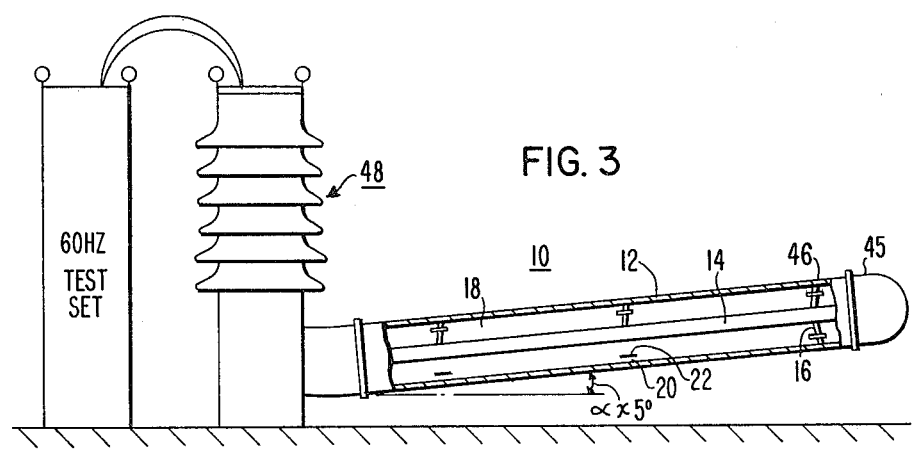
FIG. 3 is an elevational view illustrating the transmission line undergoing the conditioning procedure.

Referring now to FIG. 3, therein is illustrated a set-up which may be utilized for conditioning the transmission line 10 to prepare it for transmission line service. This conditioning procedure can occur either in the manufacturing facility or in the field, or preferably would be utilized in both locations. As shown, the transmission line 10 would be as previously described, with the addition of an end cap 45 secured to the end 46 of the line to prevent the escape of the insulating gas 18. The transmission line 10 is initially tilted at an angle to the horizontal, with the angle to the horizontal being, for example, about 5 degrees. This tilting of the transmission line 10 facilitates the use of the gravitational field to direct the motion of the particles toward the trapping regions 20 while being kept in motion by the applied electric field. The inner conductor 14 of the transmission line 10 is connected to a variable voltage source 48, illustrated as a 60 hertz test set, which can provide a plurality of voltage levels and can supply these voltage levels for varying time durations. The conditioning of the transmission line 10, after it has been tilted, occurs by utilizing the voltage source 48 to apply an alternating current voltage to the inner conductor 14 in a plurality of voltage-time steps. The voltage-time steps applied during the conditioning process increase in voltage magnitude while decreasing in time duration. In other words, a first voltage, which may be, for example, 10 percent of the factory test voltage, is applied to the inner conductor 14 for a first period of time. After the first period of time expires, a second voltage higher in magnitude than the first voltage, for example, an additional 10 percent of factory test voltage, is applied to the inner conductor 14 for a second period of time shorter in duration than the first period of time. A third voltage higher in magnitude than the second voltage is then applied to the inner conductor for a third period of time shorter in duration than the second period of time.

The voltage steps are preferably increased in approximately 10 percent steps of the factory test voltage, and the lower voltage levels are applied for longer times than the higher voltage levels. This is done in order to ensure migration of the particles at the lowest voltage levels, thereby reducing the possibility of contaminating the solid insulating supports 16 and also reduces the possibility of particle contamination moving to the high voltage inner conductor 14 whereby they might initiate breakdown. This, in turn, limits the risk of particle initiated failure at the higher voltage levels where the particles cross from the outer sheath 12 to the inner conductor 14 and the breakdown voltage decreases with the duration the voltage is held at any given voltage level. An example of the voltage-time steps applied to the inner conductor 14 is shown below, as it would be applied, for example, to a 242 kilovolt transmission line.

| Voltage kV | Time/Minutes |
|---|---|
| 50 | 10 |
| 100 | 5 |
| 150 | 2 |
| 200 | 2 |
| 250 | 2 |
| 300 | 2 |
| 350 | 1 |
| 400 | 1 |
| 425 | 1 |

To aid in ensuring particle migration at the lower voltage levels, it may be desirable to mechanically vibrate the outer sheath 12 at the lower voltage levels, for example, at the 50 and 100 kV steps. This mechanical vibration ensures that any contamination particles adhering to the outer sheath 12 are liberated.

It may also be desirable to utilize particle sensing equipment (not shown) to diagnose the presence of contamination particles, and if there is evidence of particle activity at the end of each voltage step, the duration of the applied voltage could be extended until all particles are trapped.

Therefore, it can be seen that this invention describes an improved particle trapping system for deactivating contamination particles in gas insulated transmission lines, and also discloses an improved conditioning procedure which facilitates the trapping of the contamination particles.

We claim as our invention:

1. A gas insulated transmission line comprising:
an elongated cylindrical outer sheath at low electrical potential;
an inner conductor at high electric potential with respect to said outer sheath disposed within said outer sheath;
an insulating gas electrically insulating said inner conductor from said outer sheath;
means for insulatably supporting said inner conductor within said outer sheath;
an apertured particle trapping ring disposed within, and electrically connected to, said outer sheath, said particle trapping ring being spaced-apart from said outer sheath to form a low field region therebetween, said particle trapping ring having first and second longitudinal ends;
a pair of dielectric members one of which is secured to said trapping ring first longitudinal end and the other of which is secured to said trapping ring second longitudinal end, both of said dielectric members extending longitudinally outwardly from said trapping ring and radially outwardly towards said outer sheath; and
a support sheet secured to said trapping ring and disposed on said outer sheath within said low field region, said support sheet having an adhesive coating thereon on the sheet surface facing said trapping ring.

2. The transmission line according to claim 1 wherein said dielectric members extend outwardly along an arc.

3. The transmission line according to claim 1 wherein said particle trapping ring is secured to said insulating support means.

4. The transmission line according to claim 1 wherein said support sheet is a thin, conformal plastic sheet.

5. A method for conditioning a gas-insulated transmission line of the type including a cylindrical outer sheath at low potential, an inner conductor insulatably supported within said outer sheath, and a plurality of spaced low field regions within said outer sheath each having an adhesive disposed therein, comprising the steps of:
tilting said transmission line at an angle to horizontal;
applying a first voltage to said inner conductor for a first period of time;
applying a second voltage higher in magnitude than said first voltage to said inner conductor for a second period of time shorter in duration than said first period of time; and then
applying a third voltage higher in magnitude than said second voltage to said inner conductor for a third period of time shorter in duration than said second period of time.

6. The method according to claim 5 including mechanically vibrating said outer sheath during said first period of time.

7. The method according to claim 5 including applying an additional voltage, intermediate the steps of applying said first and second voltages, higher in magnitude than said first voltage and smaller in magnitude than said second voltage, for a period of time the same as said first period of time.

8. The method according to claim 5 including applying an additional voltage, intermediate the steps of applying said second and third voltages, higher in magnitude than said second voltage and smaller in magnitude than said third voltage, for a period of time the same as said second period of time.

9. The method according to claim 5 including applying an additional voltage after the step of applying said third voltage higher in magnitude than said third voltage for a period of time the same as said third period of time.

10. A method for conditioning a gas-insulated transmission line of the type including a cylindrical outer sheath at low potential, an inner conductor insulatably supported within said outer sheath, and a plurality of spaced low field regions within said outer sheath each having an adhesive disposed therein, comprising the steps of:
applying an AC voltage to said inner conductor in a plurality of voltage-time steps, said voltage-time steps increasing in voltage magnitude while decreasing in time duration.

11. The method according to claim 10 including first tilting said transmission line at an angle to horizontal.

12. The method according to claim 10 including mechanically vibrating said outer sheath during the lower voltage steps.

13. The method according to claim 6 or 10 wherein said transmission line is tilted at an angle of about 5 degrees from horizontal.

* * * * *